(12) United States Patent
Bou-Diab et al.

(10) Patent No.: US 8,243,591 B2
(45) Date of Patent: Aug. 14, 2012

(54) METHOD AND TOOL FOR ROUTER INTERFACE L2 REDUNDANCY

(75) Inventors: Bashar Said Bou-Diab, Ottawa (CA); John Coulter, Richmond (CA)

(73) Assignee: Alcatel Lucent, Paris (FR)

( * ) Notice: Subject to any disclaimer, the term of this patent is extended or adjusted under 35 U.S.C. 154(b) by 1220 days.

(21) Appl. No.: 12/068,804

(22) Filed: Feb. 12, 2008

(65) Prior Publication Data

US 2009/0201909 A1 Aug. 13, 2009

(51) Int. Cl.
*H04L 12/26* (2006.01)

(52) U.S. Cl. ......................................... 370/225; 370/228

(58) Field of Classification Search .......................... None
See application file for complete search history.

(56) References Cited

U.S. PATENT DOCUMENTS

| | | | | |
|---|---|---|---|---|
| 6,148,410 A | * | 11/2000 | Baskey et al. | 714/4.11 |
| 7,065,038 B1 | * | 6/2006 | Brandt et al. | 370/219 |
| 7,719,959 B2 | * | 5/2010 | Shah et al. | 370/220 |
| 2005/0265346 A1 | * | 12/2005 | Ho et al. | 370/392 |
| 2006/0156403 A1 | * | 7/2006 | Haeffele et al. | 726/23 |
| 2007/0174685 A1 | * | 7/2007 | Banks et al. | 714/12 |
| 2007/0183314 A1 | * | 8/2007 | Li et al. | 370/217 |
| 2007/0274204 A1 | * | 11/2007 | Varada et al. | 370/218 |
| 2008/0181241 A1 | * | 7/2008 | Regan et al. | 370/401 |

* cited by examiner

*Primary Examiner* — Otis L Thompson, Jr.
(74) *Attorney, Agent, or Firm* — Kramer & Amado P.C.

(57) ABSTRACT

A method of router interface level 2 redundancy, and router implementing the method, including one or more of the following: starting redundant ports that are members of a level 2 redundancy group (L2RG) in a DOWN state; determining that none of the redundant ports are in an ACTIVE state; switching a first one of the redundant ports to an ACTIVE state; activating an Internet protocol interface for the L2RG; inserting an Internet protocol route for an interface subnet in an FIB of a router that contains the redundant ports; binding the Internet protocol route for the interface to the first one of the redundant ports; transitioning the first one of the redundant ports to a DOWN state; transitioning the Internet protocol interface to the DOWN state from an UP state; and removing the Internet protocol route for the interface from the FIB of the router.

18 Claims, 8 Drawing Sheets

METHOD AND TOOL FOR ROUTER INTERFACE L2 REDUNDANCY

BACKGROUND OF THE INVENTION

1. Field of the Invention

This invention relates generally to the field of Internet protocol (IP) routing.

2. Description of Related Art

IP routing denotes the set of protocols that determine the path that data follows in order to travel across multiple networks from its source to its destination. Data is routed from its source to its destination through a series of routers, and across multiple networks. The IP routing protocols enable routers to build up a forwarding table that correlates final destinations with next hop addresses.

When an IP packet is to be forwarded, a router uses its forwarding table to determine the next hop for the packet's destination, based on the destination IP address in the IP packet header, and forwards the packet appropriately. The next router then repeats this process using its own forwarding table. This process is repeated until the packet reaches its destination. At each stage, the IP address in the packet header is sufficient information to determine the next hop. No additional protocol headers are required.

In computing and especially computer networks, a lag is a symptom where result of an action appears later than expected. While different kinds of latency are well defined technical terms, lag is the symptom, not the cause.

Latency is the time taken for a packet of data to be sent from one application, travel to, and be received by another application. This includes transit time over the network, and processing time at the source and the destination computers. Specifically, this is the time for encoding the packet for transmission and transmitting it, the time for that serial data to traverse the network equipment between the nodes, and the time to get the data off the circuit. This is also known as one-way latency. A minimum bound on latency is determined by the distance between communicating devices and the speed at which the signal propagates in the circuits. This is typically 70-95% of the speed of light. Actual latency is usually much higher. This is due to packet processing in networking equipment, and other traffic.

While every packet experiences some amount of lag, the term lag is typically used to refer to delays that are noticeable to a user. Latency is directly related to the physical distance that data travels. Thus, for example, the time taken for a packet to travel from a computer server in Europe to a client in the same region is likely to be shorter than the time to travel from Europe to the Americas or Asia. Protocols and well written code that avoid unnecessary data transmissions are less affected by the latency inherent in a network. Modern corporate networks have devices to cache frequently requested data and accelerate protocols. This reduces application response time, the cumulative effect of latency.

In computer networking, the Address Resolution Protocol (ARP) is the standard method for finding a host's hardware address when only its network layer address is known. ARP is not an IP-only or Ethernet-only protocol. Rather, ARP can be used to resolve many different network-layer protocol addresses to hardware addresses. However, due to the overwhelming prevalence of IPv4 and Ethernet, ARP is often used to translate IP addresses to Ethernet MAC addresses.

ARP is also used for IP over other LAN technologies, such as Token Ring, FDDI, or IEEE 802.11, and for IP over ATM. ARP is used in four cases of two hosts communicating. These include 1) when two hosts are on the same network and one desires to send a packet to the other; 2) when two hosts are on different networks and must use a gateway/router to reach the other host; 3) when a router needs to forward a packet for one host through another router; and 4) when a router needs to forward a packet from one host to the destination host on the same network.

The first case is used when two hosts are on the same physical network, i.e. capable of directly communicating without the use of a router. The last three cases are the ones more often used over the Internet. This is true because two computers connected to the Internet are typically separated by a communications path consisting of more than three hops.

When one host wants to send data to another, the sending host needs a destination IP address for the receiving host. This is the network layer address. The IP address is found in the DNS server for a particular URL. The sending host also needs a layer 2 destination address for the receiving host. This is a destination MAC address for the receiving host. When a router lies between the sending host and the receiving host, the router interface MAC address is used instead of the receiving host MAC address. ARP is implemented to satisfy these requirements.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

Offering voice and video services over IP networks requires a high availability of IP paths for IP routing within the IP networks. Accordingly, various exemplary embodiments include redundancy of IP paths. Further, various exemplary embodiments incorporate such a redundancy on an access-link IP interface L2

In light of the present need for a method and tool for router interface L2 redundancy, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In various exemplary embodiments, redundant router IP interfaces include two or more IP interfaces with the same IP address (subnet), with different MAC addresses and physical ports. In some such embodiments, the redundant router IP interfaces work in a combination of active and standby modes and an activity status of an IP interface is determined automatically by monitoring ARP messages from neighboring nodes.

In other exemplary embodiments, one IP interface is associated with one or more ports. In a simple example, one IP interface is associated with two ports. If any one port is in an operational UP state, the IP interface state is UP. Thus, if all of the ports associated with the IP interface are DOWN, the IP interface state is DOWN.

In connection with the foregoing, various exemplary embodiments include the router interface L2 redundancy feature. In various exemplary embodiments, this feature is used to allow IP nodes using gratuitous ARP L2 redundancy models to connect directly to a router.

Accordingly, various exemplary embodiments are useful for networks providing highly available IP access interfaces. Examples of such networks include, but are not limited to, voice over Internet protocol (VoIP), Internet protocol television (IPTV) regional and hub offices and other company offices, and so on.

Elaborating on the problems described above, there is often a problem connecting an IP network element (NE) that uses redundant ports with gratuitous ARP L2 redundancy to an IP routed network. There are many IP NEs, such as VoIP gateways and servers, that use gratuitous ARP L2 redundancy models. In such L2 redundancy models, the NE connects to a router via two Ethernet links in active/standby status over a single IP subnet.

In various exemplary embodiments, the NE tests the active Ethernet link by pinging the interface IP address associated with the link. When a link failure is detected, the NE switches the activity status of both links, thus toggling between the active and standby status. In various exemplary embodiments, the NE broadcasts a gratuitous ARP reply after the activity switchover to announce the new MAC address of the newly active link for the interface IP after the switch.

It should be apparent that, based on the foregoing, various exemplary embodiments include a pair of redundant Ethernet switching devices that intermediate between the NE and the routers. In various exemplary embodiments, such an Ethernet switching feature learns the MAC of the NE ports and forwards traffic according to the MAC address in the Ethernet frame. This is true because both ports have the same IP address.

Some current embodiments consist of deploying redundant Ethernet switches to interconnect an NE using redundant ports with L2 redundancy to the IP router. Some such embodiments are directly targeted towards solving the problems described above. In some such embodiments, upon a failure, the gratuitous ARP triggers ARP learning on the router to register a new MAC address against the IP address previously in use.

In various exemplary embodiments, the new IP traffic uses the new MAC address, and the redundant Ethernet switches with the MAC learning to direct traffic automatically to the correct port based on the destination MAC addresses in the Ethernet frames. However, such embodiments necessitate infrastructure expenses for the redundant Ethernet switches. Accordingly, various exemplary embodiments overcome this problem by eliminating the expense for redundant Ethernet switches.

Other current embodiments solve the foregoing problems using link aggregation control protocol (LACP) between the NE and the router. However, such embodiments are currently uncommon, though they may become common in the future.

Accordingly, various exemplary are a method of router interface level 2 redundancy, and router implementing the method, including one or more of the following: starting redundant ports that are members of a level 2 redundancy group (L2RG) in a DOWN state; determining that none of the redundant ports are in an ACTIVE state; switching a first one of the redundant ports to an ACTIVE state; activating an Internet protocol interface for the L2RG; inserting an Internet protocol route for an interface subnet in an FIB of a router that contains the redundant ports; binding the Internet protocol route for the interface to the first one of the redundant ports; transitioning the first one of the redundant ports to a DOWN state; transitioning the Internet protocol interface to the DOWN state from an UP state; and removing the Internet protocol route for the interface from the FIB of the router.

Various exemplary embodiments also include one or more of the following: determining that first one of the redundant ports is in the ACTIVE state; switching the first one of the redundant ports to a STANDBY state; receiving a gratuitous address resolution protocol reply; transitioning a second one of the redundant ports of the level 2 redundancy group from the STANDBY state to the ACTIVE state; transitioning the first one of the redundant ports to the STANDBY state; changing a binding of the Internet protocol route from the first one of the redundant ports to the second one of the redundant ports; and disassociating the binding of the Internet protocol route from the first one of the redundant ports and associating the binding of the Internet protocol route with the second one of the redundant ports.

Various exemplary embodiments also include one or more of the following: connecting an Internet protocol node directly to an Internet protocol routing device; establishing one Internet protocol interface having one Internet protocol subnet; establishing the level 2 redundancy group with a plurality of different ports that are the redundant ports; and using gratuitous address resolution protocol level 2 redundancy to connect the Internet protocol node directly to the Internet protocol routing device.

In various exemplary embodiments the first one of the redundant ports transitions to the DOWN state upon a physical link failure causing a loss of signal or upon an administrative command for the first one of the redundant ports to transition to the DOWN state; and the Internet protocol interface is transitioned to the DOWN state upon a determination that all of the redundant ports of the level 2 redundancy group are in the DOWN state, or upon an administrative command that the interface state transition to the DOWN state.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Referring now to the drawings, in which like numerals refer to like components or steps, there are disclosed broad aspects of various exemplary embodiments.

Figure 1:
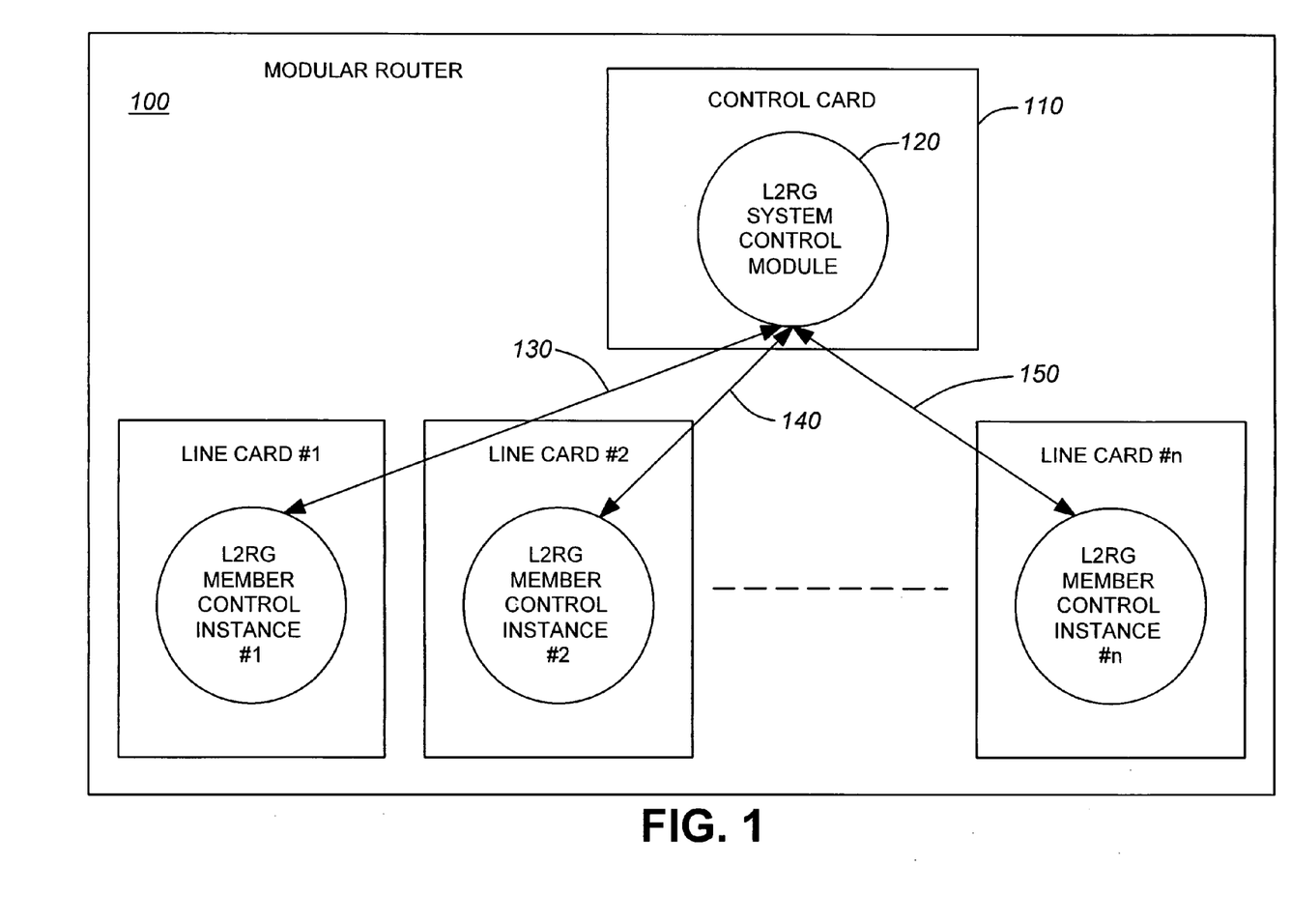
FIG. 1 is a schematic diagram of the first exemplary embodiment of a router for use in a system for router interface level two redundancy.

FIG. 1 is a schematic diagram of the first exemplary embodiment of a router 100 for use in a system for router interface level two redundancy. The router 100 is a modular router and includes a control card 110, a line card #1, a line card #2 and a line card #n. Line card #n is intended to represent that, in various exemplary embodiments, the modular router 100 includes any number of line cards.

Control card 110 includes layer 2 redundancy group (L2RG) system control module 120. Similarly, line card #1 includes L2RG member control instance #1. Line card #2 includes L2RG member control instance #2, and line card #n includes L2RG member control instance #n.

Control messaging path 130 passes between L2RG member control instance #1 and L2RG system control module 120. Similarly, control messaging path 140 passes between L2RG member control instance #2 and L2RG system control module 120. Likewise, control messaging path 150 passes between L2RG member control instance #n and L2RG system control module 120. The operation of the various elements in modular router 100 will be discussed in greater detail below in connection with other Figures.

Figure 2:
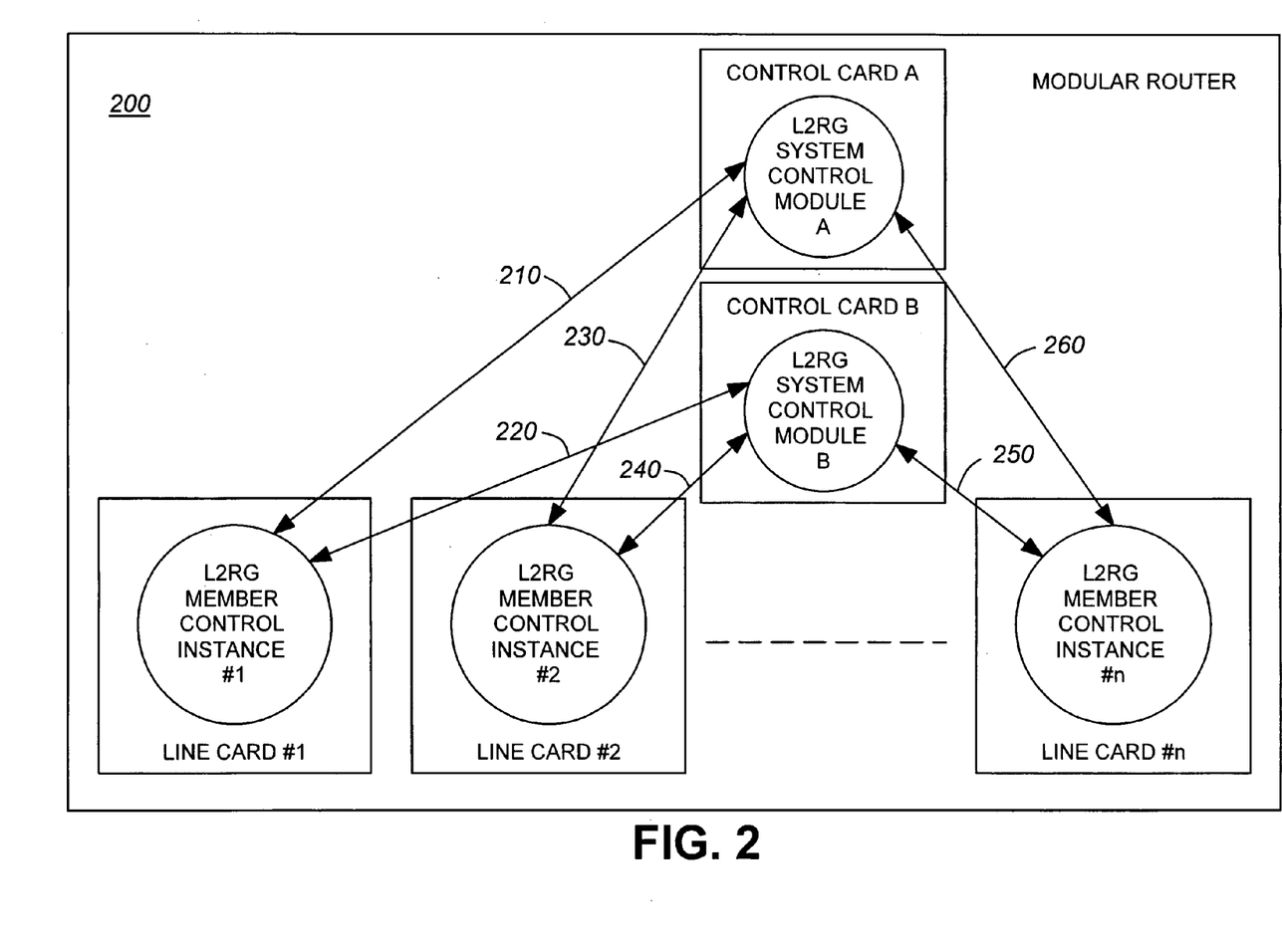
FIG. 2 is a schematic diagram of a second exemplary embodiment of a router for use in a system for router interface level two redundancy.

FIG. 2 is a schematic diagram of a second exemplary embodiment of a router 200 for use in a system for router interface level two redundancy. Router 200 is a modular router. Modular router 200 includes line card #1 with L2RG member control instance #1, line card #2 with L2RG member control instance #2 and line card #n with L2RG member control instance #n just as with modular router 100. The primary difference between modular router 200 and modular router 100 is that the control card 110 is duplicated into two cards in modular router 200 for redundance. Thus, modular router 200 includes control card A and control card B.

Control card A includes L2RG system control module A. Similarly, control card B includes L2RG system control module B. The combination of L2RG system control module A and L2RG system control module B functions the same as L2RG system control module 120. Thus, the functions attributed to the system control module elsewhere herein are performed alternatively in various exemplary embodiments by a single system control module such as L2RG system control module 120 or by a system control module broken into multiple components such as the combination of L2RG system control module A and L2RG system control module B.

Because the combination of L2RG system control module A and L2RG system control module B functions as L2RG system control module 120, in exemplary modular router 200 each of L2RG member control instance #1, L2RG member control instance #2 and L2RG member control instance #n have a control messaging path to each of L2RG system control module A and L2RG system control module B. However, it should be apparent that, in various exemplary embodiments, the functions attributed to the system control module herein are accomplished as long as each member control instance is in control messaging communication with at least one portion of the system control module. In other words, it should be apparent that, in embodiments where the system control module is broken into multiple components as with modular router 200, it is not absolutely necessary that each member control instance be in direct communication with each portion of the system control module.

As depicted in connection with modular router 200, L2RG member control instance #1 has control messaging path 210 to L2RG system control module A and control messaging path 220 to L2RG system control module B. Likewise, L2RG member control instance #2 has control messaging path 230 to L2RG system control module A and control messaging path 240 to L2RG system control module B. L2RG member control instance #n has control messaging path 250 to L2RG system control module B and control messaging path 260 to L2RG system control module A. As with modular router 100, the functions performed by the various components of modular router 200 are discussed elsewhere herein.

Figure 3:
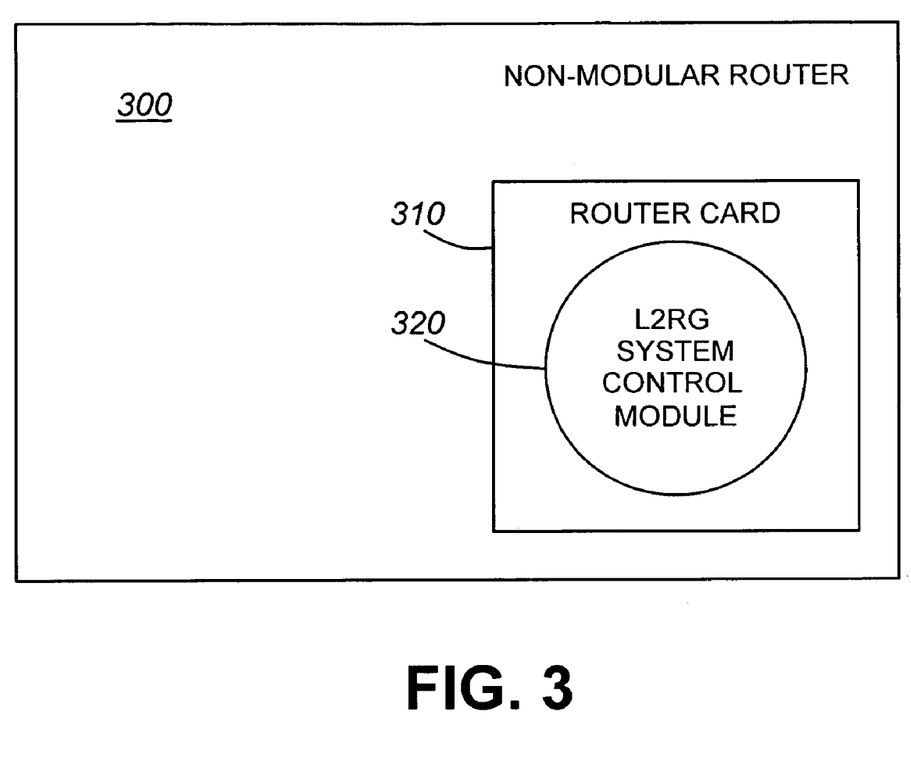
FIG. 3 is a schematic diagram of a third exemplary embodiment of a router for use in a system for router interface level two redundancy.

FIG. 3 is a schematic diagram of a third exemplary embodiment of a router 300 for use in a system for router interface level two redundancy. Exemplary router 300 is a non-modular router. Thus, non-modular router 300 includes router card 310. Because router 300 is a non-modular router, it does not include a plurality of line cards. Rather, L2RG system control module 320 within router card 310 performs for all of the functions of the member control instances and system control modules in modular router 100 and modular router 200.

Thus, L2RG system control module 320 includes not only all of the features of L2RG system control module 120, but also all of L2RG member control instance #1, L2RG member control instance #2 and L2RG member control instance #n. Each of these components are in self contained control messaging communication with one another within system control module 320 on router card 310 of non-modular router 300.

Accordingly, it should be apparent that all of the functions described elsewhere herein are performed by any of modular router 100, modular router 200 and non-modular router 300. No limitations exist restricting the performance of the various functions described elsewhere herein to any one or subset of modular router 100, modular router 200 and non-modular router 300. Rather, any of modular router 100, modular router 200 and non-modular router 300 are selected in various exemplary embodiments to perform any of the functions described herein.

Accordingly, various exemplary embodiments implement a redundant or single router interface control module to monitor ARP activity on two redundant IP interfaces or a single IP interface having the same IP subnet on two different ports. This is used to control the activity status of the two different ports and for binding the subnet IP route to the active port. This is described in greater detail in connection with FIGS. 4-8 below.

Figure 4:
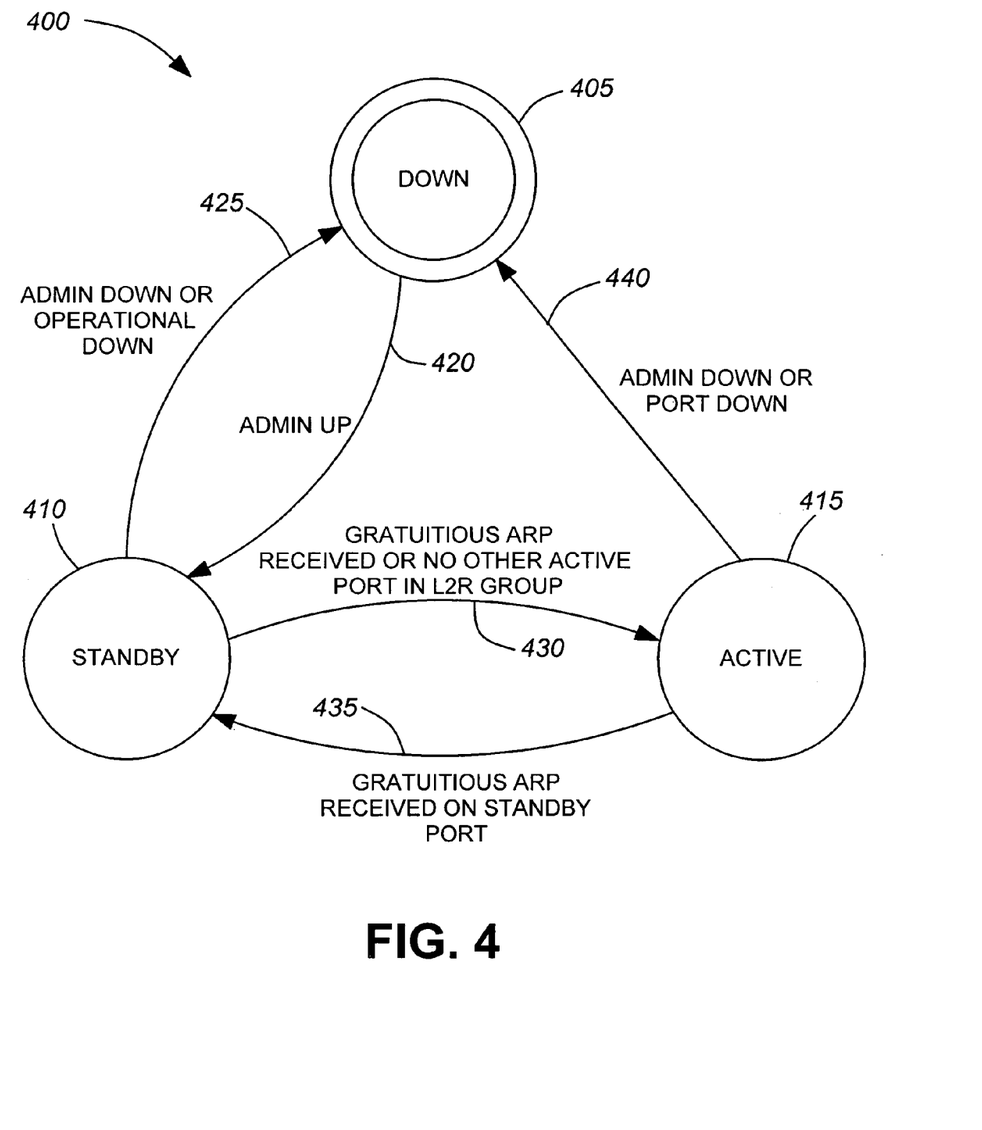
FIG. 4 is an exemplary embodiment of a port state diagram for use in connection with a system and method for router interface level two redundancy.

FIG. 4 is an exemplary embodiment of a port state diagram 400 for use in connection with a system and method for router interface level two redundancy. Exemplary port state diagram 400 depicts three states for ports of router 100, router 200, router 300 that are a part of the L2RG. Those three states are DOWN 405, STANDBY 410 and ACTIVE 415.

The redundant ports in router 100, 200, 300 that are part of the L2RG (redundant router IP interface group or R2I2G) start in the DOWN 405 state. A port of router 100, 200, 300 that is part of the L2RG then transitions to STANDBY 410 via transition path 420 during an initialization procedure. Such an initialization procedure is referred to in state diagram 400 as ADMIN UP.

A port of router 100, 200, 300 transitions back to the DOWN 405 state via transition path 425 upon one of two occurrences. First, a port of router 100, 200, 300 transitions from STANDBY 410 to DOWN 405 via transition path 405 when it is deliberately configured to go DOWN. This is referred to in state diagram 400 as ADMIN DOWN.

The other condition upon which a port of router 100, 200, 300 that is part of the L2RG transitions from STANDBY 410 to DOWN 405 via transition path 425 occurs when the port becomes operationally DOWN. A port becomes operationally DOWN when the port gets cut, a link associated with the port gets cut, a fiber necessary for communications from the port gets cut, and so on.

A port of router 100, 200, 300 that is part of the L2RG transitions from STANDBY 410 to ACTIVE 415 via transition path 430. Transition path 430 is followed upon one of two conditions. First, a port of router 100, 200, 300 that is part of the L2RG transitions from STANDBY 410 to ACTIVE 415 via transition path 430 when a gratuitous ARP is received. The other condition upon which transition path 430 is followed occurs when there is no other ACTIVE port in the L2RG.

A port in router 100, 200, 300 that is part of the L2RG transitions from ACTIVE 415 to STANDBY via transition path 435. Transition path 435 is followed when a gratuitous ARP is received by a different port of router 100, 200, 300 that is part of the L2RG and is in the STANDBY 410 state. Transition paths 430 and 435 are followed in tandem by two ports of the L2RG.

In the ACTIVE 415 state, IP communication proceeds over the ACTIVE IP port as usual. When transitions are occurring between STANDBY 410 and ACTIVE 415, the STANDBY port transitions into ACTIVE 415 state and the previously ACTIVE port transitions to the STANDBY 410 state. Accordingly, the associated subnet IP router binding is switched from the old ACTIVE port to the new ACTIVE port. Accordingly, it should be understood that this association of the subnet router with the ACTIVE port occurs at the end of transition 430. Similarly, at the end of transition 435, the subnet route binding is disassociated from the port entering STANDBY state 410.

A port of router 100, 200, 300 that is in the L2RG transitions from ACTIVE state 415 directly to DOWN state 405 via transition path 440. This transition occurs upon one of two conditions. First, a port transitions along transition path 440 when it is administratively configured to do so as indicated by ADMIN DOWN. Second, a port transitions along transition path 440 if the port is operationally DOWN. This was discussed above in connection with transition path 425 and is indicated in connection with transition path 440 as PORT DOWN. In addition to the description above in connection with transition path 425, an operationally DOWN port can be thought of as a loss of signal (LOS) corresponding to a physical failure of a link. At the end of transition path 440, the subnet route binding is disassociated from the port entering the DOWN state 405.

The port states 405, 410, 415 and the transitions there between 420, 425, 430, 435, 440 are controlled by the system control module. As described above, the configurable port priority attribute is used for preempting an ACTIVE port with a STANDBY port and causing a manual switch between the ACTIVE port and the STANDBY port. Accordingly, it should be apparent that the L2RG consists of at least two ports. However, it should also be apparent that, in various exemplary embodiments, the L2RG consists of more than two ports.

Likewise, in various exemplary embodiments, all of the plurality of ports in the L2RG reside on a single line card. However, in other exemplary embodiments, the plurality of ports in the L2RG reside on a plurality of line cards. In fact, in various exemplary embodiments, only one port of the L2RG resides on each line card. Thus, in such embodiments, the number of line cards with ports in the L2RG is equal to the number of ports in the L2RG.

The foregoing state transitions depicted in port state diagram 400 will now be described in connection with a simple example. In this example, L2RG member control instance #1 and L2RG member control instance #2 have ports in the same L2RG. The port of L2RG member control instance #1 that is part of the L2RG is in an ACTIVE state 415. The port in L2RG member control instance #2 that is part of the L2RG is in a STANDBY state 410.

A gratuitous ARP is received by the port of L2RG member control instance #2 that is part of the L2RG. Then, L2RG member control instance #2 communicates with the system control module via a control messaging path or paths that the gratuitous ARP has been received and sends an instruction to deactivate the ACTIVE port.

In response to this communication received from L2RG member control instance #2 by the system control module, the system control module transitions the port of L2RG member control instance #1 that is part of the L2 RG from ACTIVE state 415 to STANDBY state 410 via transition path 435. Likewise, at that time the port in L2 RG member control instance #2 that is part of the L2 RG transitions from STANDBY state 410 to ACTIVE state 415 via transition path 430. Accordingly, the system control module controls the states of the ports in the L2 RG.

Figure 5:
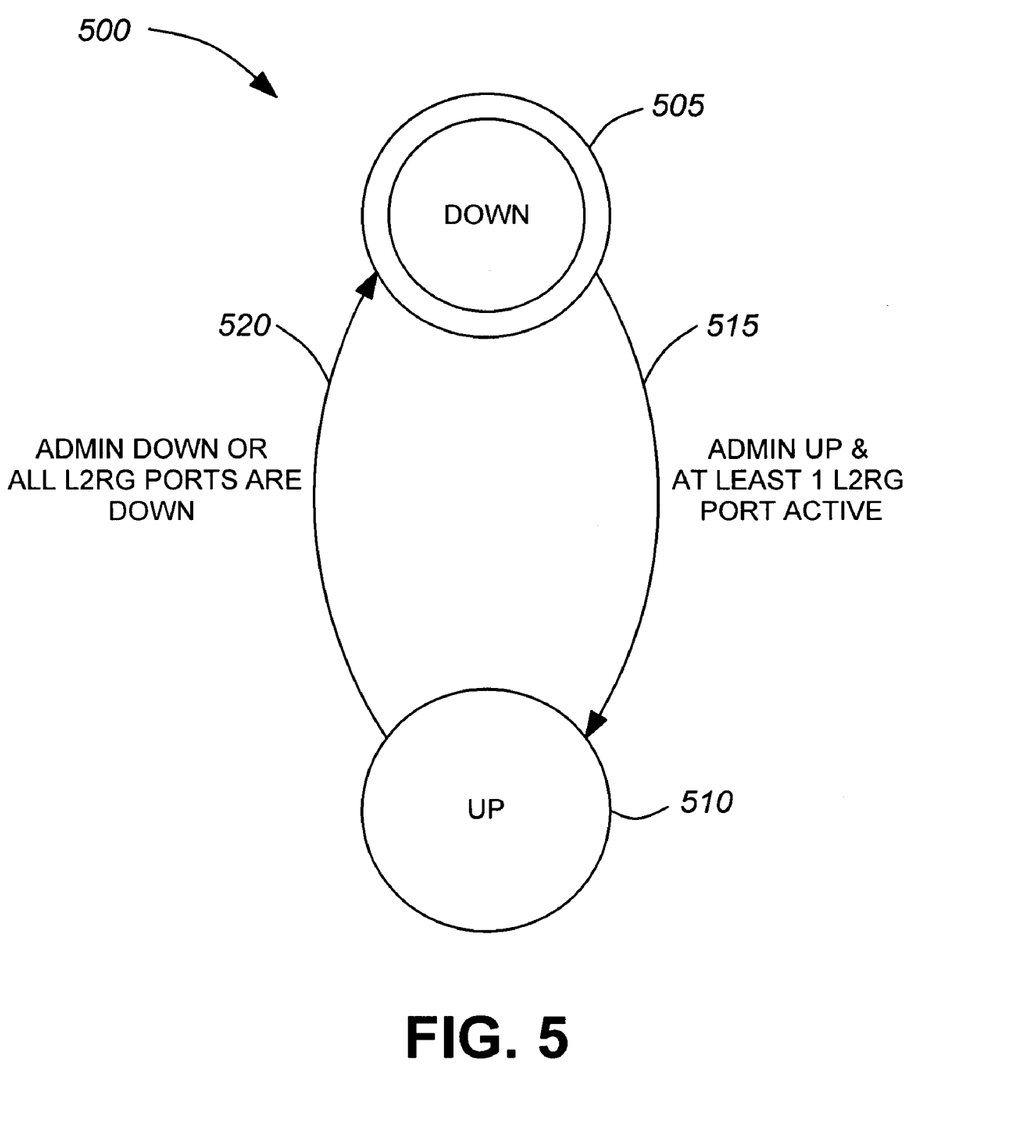
FIG. 5 is an exemplary embodiment of an interface state diagram for use in connection with a system and method for router interface level two redundancy.

FIG. 5 is an exemplary embodiment of an interface state diagram 500 for use in connection with a system and method for router interface level two redundancy. The interface state diagram 500 has two states. The two states of the interface state diagram 500 are DOWN 505 and UP 510. The interface begins in the DOWN state 505.

The interface transitions from a DOWN state 505 to the UP state 510 via transition path 515. Transition path 515 is followed when two conditions are satisfied. Those two conditions are that the interface has been administratively configured to be in an UP state, indicated as ADMIN UP and at least one of L2 RG ports is in an ACTIVE state 415. When these two conditions are satisfied and transition path 515 is followed for the administrative state, an IP interface subnet route binding is added at the end of transition path 515. The IP interface subnet is inserted in the FIB of router 100, 200, 300 and bound to the port of the L2 RG in the ACTIVE state 415.

The administrative state transitions from UP 510 to DOWN 505 via transition path 520. Transition path 520 is followed when either of the conditions necessary for transition path 515 are no longer true. Thus, transition path 520 is followed when an administrative instruction is sent to transition to the DOWN state 505, represented as ADMIN DOWN or when all of the ports in the L2 RG are in the DOWN state 405. At the end of transition path 520, the IP interface subnet route binding is removed.

Based on the foregoing, there are three aspects of the subject matter described herein. First, the L2 RG is created from two or more ports. Second, the state of the ports in the L2 RG are controlled by the system control module according to port state diagram 400. Third, the state of the IP interface that uses the L2 RG is controlled by the control module according to interface state diagram 500. The implementation of this larger overview according to various exemplary embodiments will now be described in connection with FIGS. 6-8.

Figure 6:
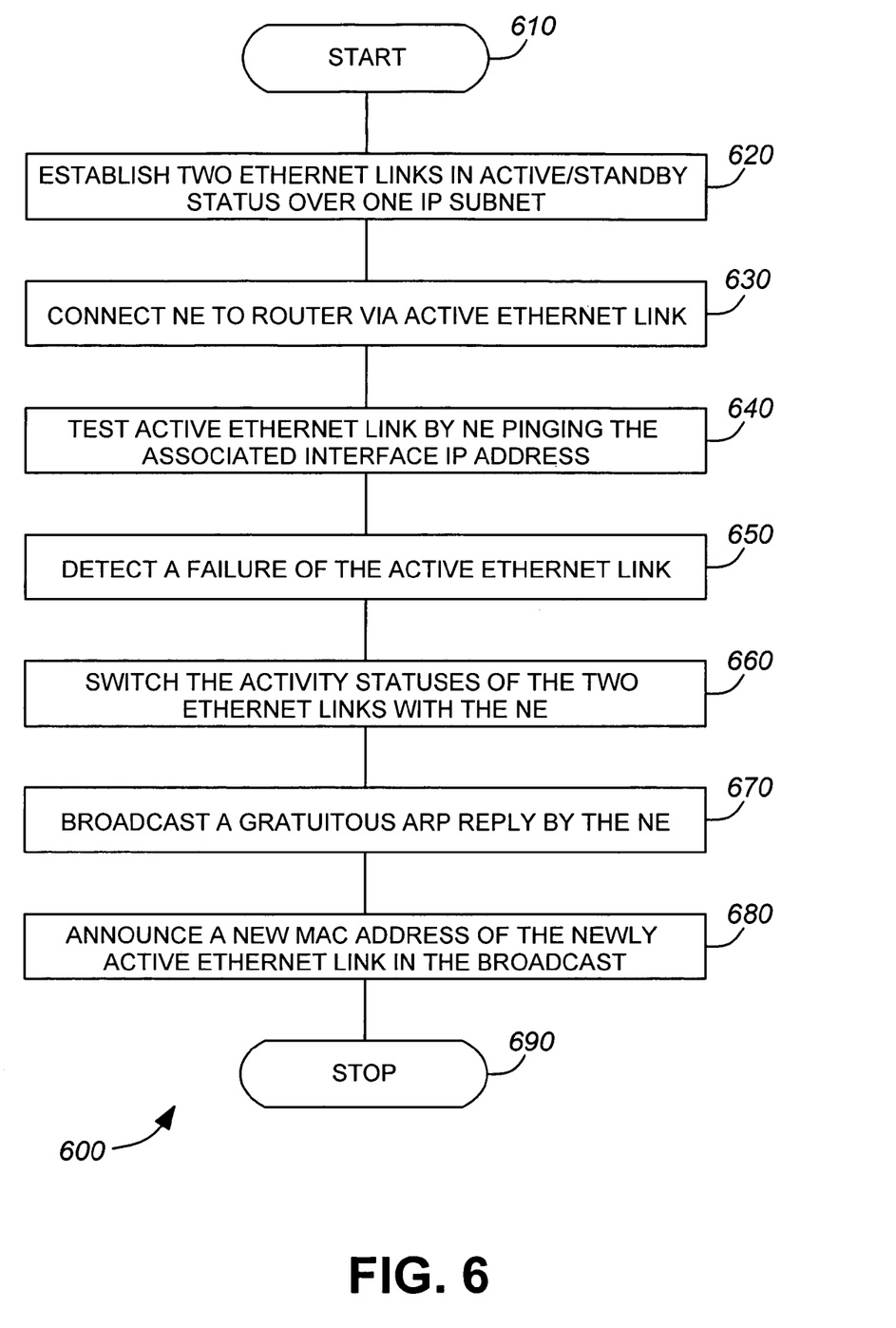
FIG. 6 is a flow chart of a method for connecting IP NEs to an IP routed network through an Ethernet switched network.

FIG. 6 is a flow chart of a method 600 for connecting IP NEs to an IP routed network through an Ethernet switched network. The method 600 starts in step 610 and continues to step 620.

In step 620, two Ethernet links are established over one IP subnet. One of the two established Ethernet links is in a STANDBY status or state, and the other of the two established Ethernet links is in an ACTIVE status or state.

Following step 620, the method 600 proceeds to step 630. In step 630, a network element (NE) is connected to a router via the ACTIVE Ethernet link established in step 620. In various exemplary embodiments, the network element is a server. In other exemplary embodiments, the network element is a voice over Internet protocol "VoIP" gateway. A server and a VoIP gateway are examples of NEs. Thus, it should be understood that there are many other examples of elements that function as network elements as that term is used herein.

In step 640, the NE pings an associated interface IP address to test the ACTIVE Ethernet link established in step 620. Following step 640, the method 600 proceeds to step 650.

In step 650, a failure of the ACTIVE Ethernet link is detected. Following step 650, the method 600 proceeds to step 660.

In step 660, the NE switches the activity statuses of the two Ethernet links established in step 620. Thus, in step 660, the ACTIVE Ethernet link becomes a STANDBY Ethernet link, and the STANDBY Ethernet link becomes an ACTIVE Ethernet link.

In step 670, a gratuitous ARP reply is broadcast by the NE. Following step 670, the method 600 proceeds to step 680.

The newly active Ethernet link in the broadcast of step 670 has a new MAC address. In step 680 this new MAC address is announced. Following step 680, the method 600 proceeds to step 690 where the method 600 stops.

Figure 7:
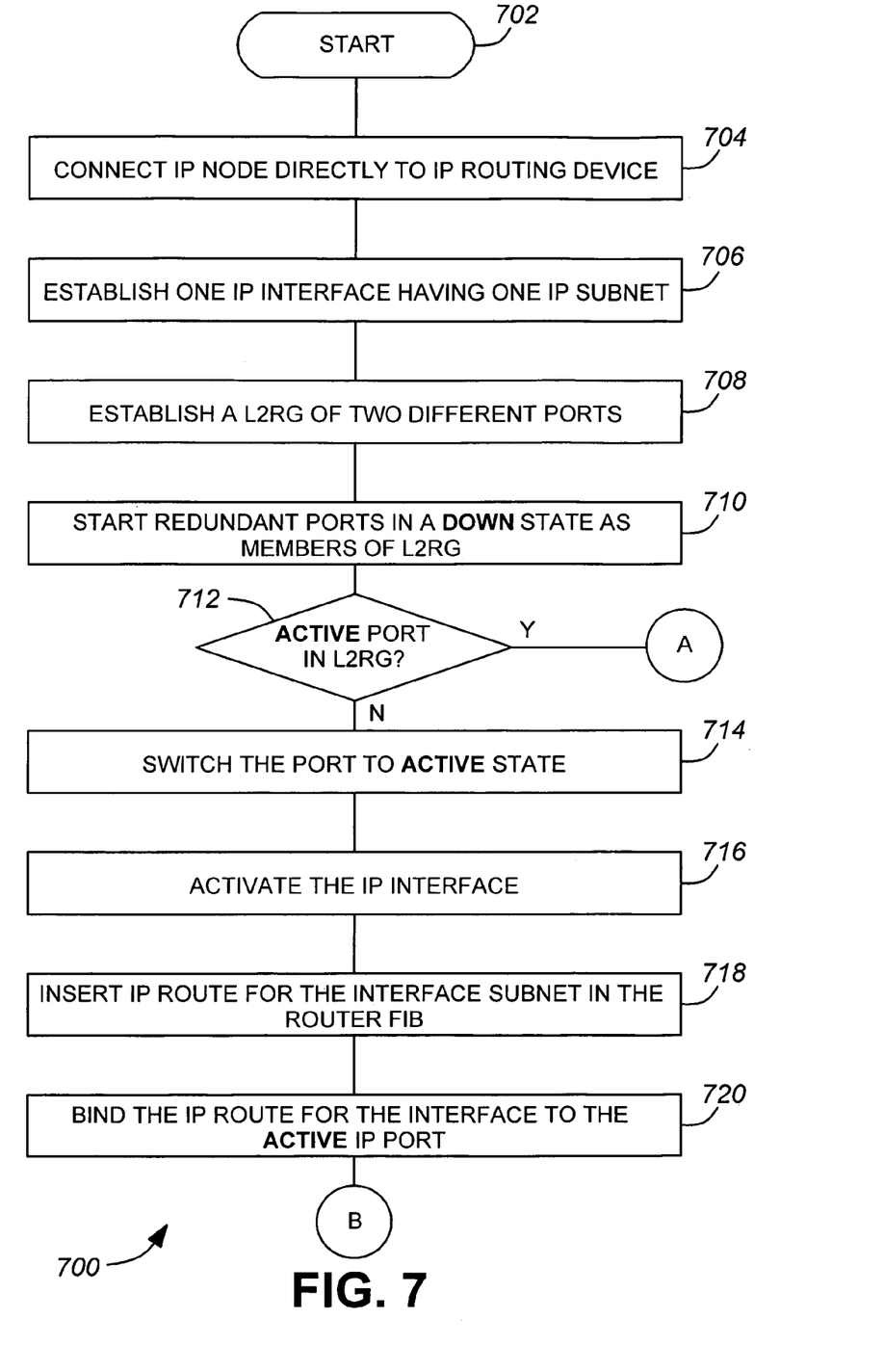
FIG. 7 is a flow chart of an exemplary embodiment of a method for router interface level two redundancy.

FIG. 7 is a flow chart of an exemplary embodiment of a method 700 for router interface level two redundancy. Method 700 starts in step 702 and proceeds to step 704.

In step 704, an IP node is directly connected to an IP routing device. In various exemplary embodiments, step 704 is accomplished using gratuitous ARP L2 redundancy.

In step 706, one IP interface having one IP subnet is established. In step 708, an L2RG of two different ports is also established. Once the L2RG is set up in this manner, the transitions described above in connection with the state diagram 400 and state diagram 500 begin. Accordingly, in step 710, all of the redundant ports to be part of the L2RG are started in a DOWN state 405 as members of the L2RG.

Next, after the L2RG begins functioning, an evaluation is made whether any of the redundant ports that are members of the L2RG are in an ACTIVE state. When a determination is made in step 712 that one of the ports in the L2RG is in an ACTIVE state 415, the method 700 proceeds to step 724 in FIG. 8 as indicated by transitional element A.

When a determination is made in step 712 that none of the ports that are members of the L2RG are in an ACTIVE state 415, the method 700 proceeds to step 714. In step 714, one of the ports in the L2RG is switched to ACTIVE state 415. Correspondingly, in step 716, the IP interface is activated. Thus, in step 716, the interface state transitions from DOWN 505 to UP 510 via transition path 515.

Accordingly, in step 718, the IP route for the interface subnet is inserted in the router FIB. Likewise, in step 720, the IP route for the interface is bound to the ACTIVE IP port in the L2RG. Following step 720, method 700 proceeds to step 734 via transitional element B. This will be discussed in greater detail below in connection with FIG. 8.

Figure 8:
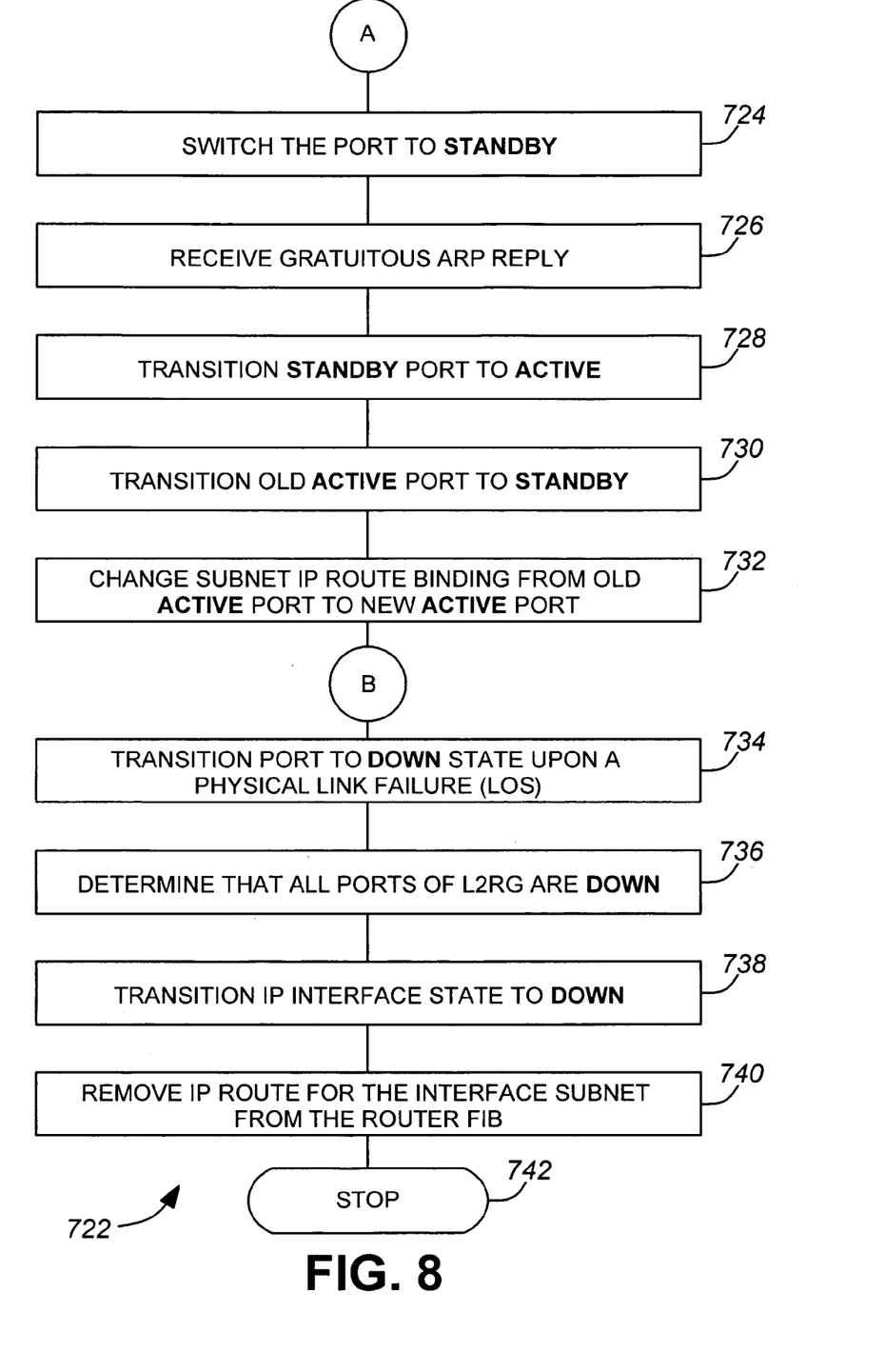
FIG. 8 is a flow chart of a continuation of the method of FIG. 7.

FIG. 8 is a flow chart 722 of a continuation of the method 700 of FIG. 7. Flow chart 722 begins in step 724. Step 724 is reached, as mentioned above, via transitional element A when a determination is made in step 712 that the L2RG has a port in the ACTIVE state 415.

In step 724, the port in the L2RG that is in the ACTIVE state 415 is switched to the STANDBY state 410 via transition path 435. Accordingly, in step 726, the gratuitous ARP reply is received. Likewise, in step 728, the port in the L2RG in the STANDBY state 410 is transitioned to the ACTIVE state 415 via transition path 430.

Accordingly, in step 730, the previously ACTIVE port is transitioned from ACTIVE 415 to STANDBY 410 via transition path 435. Thus, as discussed above, at the end of transition path 435, the IP route binding is disassociated from the port transitioning from ACTIVE 415 to STANDBY 410 and associated with the port transitioning from STANDBY 410 to ACTIVE 415.

In step 734, the ACTIVE port is transitioned from ACTIVE state 415 to DOWN state 405 via transition path 440. As discussed above, step 734 occurs when there is a physical link failure (LOS). Step 734 also occurs upon execution of an administrative command for such a transition.

In step 736 a determination is a made that all ports in the L2RG are in the DOWN state 405. As described above in connection with transition path 520, when the determination of step 736 is made, the IP interface state is transitioned from UP 510 to DOWN 505 in step 738. The IP interface state is also transitioned from UP to DOWN 505 in step 738 upon an administrative command for such a state change to occur.

In step 740, the IP route for the interface subnet is removed from the router FIB. This was also described above as the removal of the IP interface subnet route binding in connection with transition path 520. Following step 740, the method 700 proceeds to step 742 where the method 700 stops.

Based on the foregoing, various exemplary embodiments eliminate the need to purchase redundant Ethernet switches in order to offer level 2 style (gratuitous ARP) redundancy between an NE and a router. Accordingly, various exemplary embodiments save network operators the expense of redundant Ethernet switches and associated components to offer level 2 style redundancy to VoIP gateways and other servers in a network operator's corporate office for other centralized operational location. Accordingly, it is believed that various exemplary embodiments will save certain corporations a significant quantity of money.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of router interface level 2 redundancy, comprising:
   starting redundant ports that are members of a level 2 redundancy group in a DOWN state;
   determining that none of the redundant ports that are members of the level 2 redundancy group are in an ACTIVE state;
   switching a first one of the redundant ports that are members of the level 2 redundancy group to an ACTIVE state;
   activating an Internet protocol interface for the level 2 redundancy group;
   inserting an Internet protocol route for an interface subnet in an FIB of a router, wherein the interface subnet contains the redundant ports that are members of the level 2 redundancy group;
   binding the Internet protocol route for the interface to the first one of the redundant ports;
   determining that the first one of the redundant ports is in the ACTIVE state;
   receiving a gratuitous address resolution protocol reply;

transitioning a second one of the redundant ports of the level 2 redundancy group from the STANDBY state to the ACTIVE state;

transitioning the first one of the redundant ports to the STANDBY state;

maintaining the Internet protocol route for the interface subnet in the FIB while transitioning the state of the ports;

and;

changing a binding of the Internet protocol route from the first one of the redundant ports to the second one of the redundant ports.

2. The method of router interface level 2 redundancy, according to claim 1, further comprising:

transitioning the ACTIVE one of the redundant ports to a DOWN state;

transitioning the Internet protocol interface to the DOWN state from an UP state; and removing the Internet protocol route for the interface from the FIB of the router.

3. The method of router interface level 2 redundancy, according to claim 2, further comprising disassociating the binding of the Internet protocol route from the first one of the redundant ports and associating the binding of the Internet protocol route with the second one of the redundant ports.

4. The method of router interface level 2 redundancy, according to claim 1, further comprising:

connecting an Internet protocol node directly to an Internet protocol routing device;

establishing one Internet protocol interface having one Internet protocol subnet; and establishing the level 2 redundancy group with a plurality of different ports that are the redundant ports.

5. The method of router interface level 2 redundancy, according to claim 4, wherein connecting the Internet protocol node directly to the Internet protocol routing device is accomplished using gratuitous address resolution protocol level 2 redundancy.

6. The method of router interface level 2 redundancy, according to claim 1, wherein the first one of the redundant ports transitions to the DOWN state upon a physical link failure causing a loss of signal.

7. The method of router interface level 2 redundancy, according to claim 1, wherein the first one of the redundant ports transitions to the DOWN state upon an administrative command for the first one of the redundant ports to transition to the DOWN state.

8. The method of router interface level 2 redundancy, according to claim 1, wherein the Internet protocol interface is transitioned to the DOWN state upon a determination that all of the redundant ports of the level 2 redundancy group are in the DOWN state.

9. The method of router interface level 2 redundancy, according to claim 1, wherein the Internet protocol interface state is transitioned to the DOWN state upon an administrative command that the interface state transition to the DOWN state.

10. A router for router interface level 2 redundancy, comprising:

means for starting redundant ports that are members of a level 2 redundancy group in a DOWN state;

means for determining that none of the redundant ports that are members of the level 2 redundancy group are in an ACTIVE state;

means for switching a first one of the redundant ports that are members of the level 2 redundancy group to an ACTIVE state;

means for activating an Internet protocol interface for the level 2 redundancy group;

means for inserting an Internet protocol route for an interface subnet in an FIB of a router that contains the redundant ports that are members of the level 2 redundancy group;

means for binding the Internet protocol route for the interface to the first one of the redundant ports;

means for transitioning the first one of the redundant ports to a DOWN state;

means for transitioning the Internet protocol interface to the DOWN state from an UP state; and means for removing the Internet protocol route for the interface from the FIB of the router, means for determining that the first one of the redundant ports is in the ACTIVE state;

means for receiving a gratuitous address resolution protocol reply;

means for transitioning a second one of the redundant ports of the level 2 redundancy group from the STANDBY state to the ACTIVE state;

means for transitioning the first one of the redundant ports to the STANDBY state;

means for maintaining the Internet protocol route for the interface subnet in the FIB;

and means for changing a binding of the Internet protocol route from the first one of the redundant ports to the second one of the redundant ports.

11. The router for router interface level 2 redundancy, according to claim 10, further comprising:

means for transitioning the ACTIVE one of the redundant ports to a DOWN state;

means for transitioning the Internet protocol interface to the DOWN state from an UP state; and means for removing the Internet protocol route for the interface from the FIB of the router.

12. The router for router interface level 2 redundancy, according to claim 11, further comprising means for disassociating the binding of the Internet protocol route from the first one of the redundant ports and means for associating the binding of the Internet protocol route with the second one of the redundant ports.

13. The router for router interface level 2 redundancy, according to claim 10, further comprising:

means for connecting an Internet protocol node directly to an Internet protocol routing device;

means for establishing one Internet protocol interface having one Internet protocol subnet; and means for establishing the level 2 redundancy group with a plurality of different ports that are the redundant ports.

14. The router for router interface level 2 redundancy, according to claim 13, wherein the means for connecting the Internet protocol node directly to the Internet protocol routing device uses gratuitous address resolution protocol level 2 redundancy.

15. The router for router interface level 2 redundancy, according to claim 10, wherein the first one of the redundant ports transitions to the DOWN state upon a physical link failure causing a loss of signal.

16. The router for router interface level 2 redundancy, according to claim 10, wherein the first one of the redundant ports transitions to the DOWN state upon an administrative command for the first one of the redundant ports to transition to the DOWN state.

17. The router for router interface level 2 redundancy, according to claim 10, wherein the Internet protocol interface is transitioned to the DOWN state upon a determination that all of the redundant ports of the level 2 redundancy group are in the DOWN state.

18. The router for router interface level 2 redundancy, according to claim 10, wherein the Internet protocol interface state is transitioned to the DOWN state upon an administrative command that the interface state transition to the DOWN state.

* * * * *